Aug. 26, 1952 M. T. WADDELL ET AL 2,608,523
HYPOCHLORITE SWEETENING OF DISTILLATES
Filed July 30, 1951
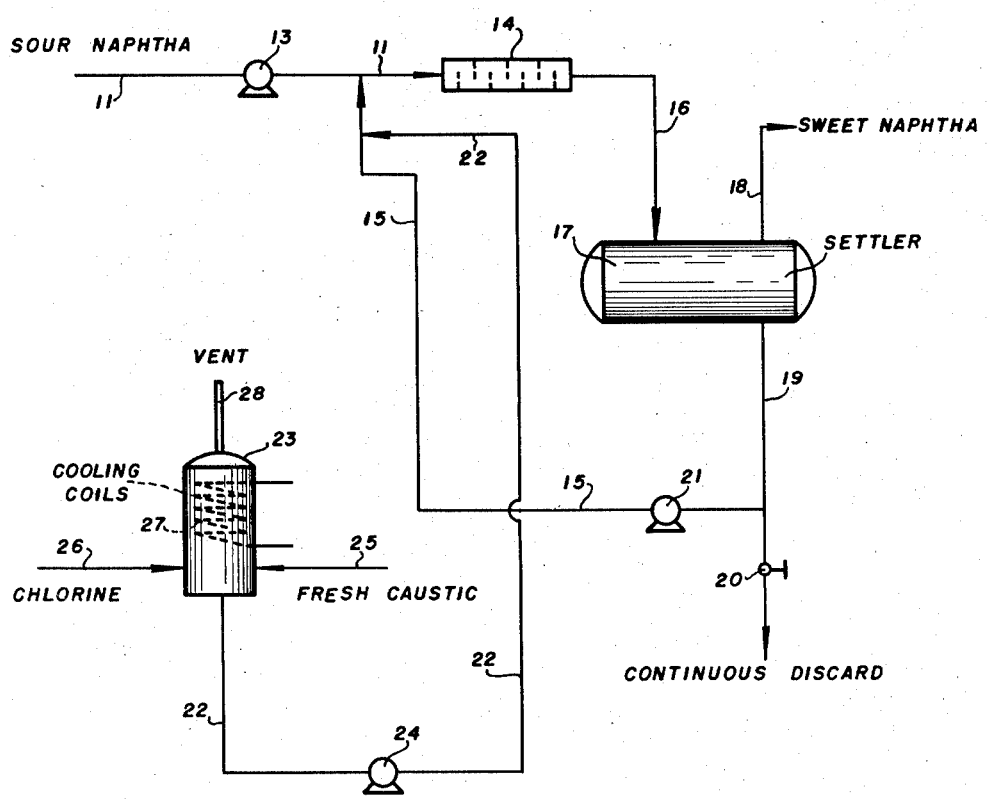
INVENTORS.
Mathis T. Waddell,
Harold W. Earhart,
Robert M. Love,
James S. Tiller,
BY
AGENT.

Patented Aug. 26, 1952

2,608,523

UNITED STATES PATENT OFFICE 2,608,523

HYPOCHLORITE SWEETENING OF DISTILLATES

Mathis T. Waddell, Harold W. Earhart, and Robert M. Love, Baytown, and James S. Tiller, Dallas, Tex., assignors, by mesne assignments, to Standard Oil Development Company, Elizabeth, N. J., a corporation of Delaware Application July 30, 1951, Serial No. 239,302

5 Claims. (Cl. 196—29)

The present invention is directed to the sweetening of sour petroleum distillates with alkaline hypochlorite solution. More particularly, the invention is directed to the treatment of sour distillates containing organic acidic bodies by contacting same with alkaline hypochlorite solution.

Hypochlorite sweetening has been known for a long number of years. When efforts were made to apply the hypochlorite sweetening process to naphthas which contain organic acids, difficulties were encountered in that the consumption of chemicals was high. Investigation revealed that the organic acid bodies contained in cracked naphtha, such as thermally and catalytically cracked naphtha, are essentially phenolic materials, such as phenols, cresols, xylenols, and the like. Naphthenic acids are also associated with the phenolic bodies. It is believed that the excessive consumption of treating reagent experienced when processing catalytically cracked naphtha in a hypochlorite sweetening process is due to direct chlorination of acidic compounds. It has been observed that acidification of recirculated hypochlorite solutions results in the separation of three layers, a top organic acid layer, a middle aqueous layer containing inorganic salts, and a bottom chlorinated organic acid layer, instead of the conventional two layers, that is a top organic acid layer and a bottom aqueous inorganic salt layer which are normally obtained when caustic solutions that have been contacted with cracked naphthas are acidified. Analysis of a bottom organic acid layer obtained on acidifying a spent hypochlorite solution that had been used to treat a catalytically cracked naphtha revealed that the organic acid material had a chlorine content of 18 weight per cent.

It is the main object of the present invention to provide a process in which chlorination of organic acid bodies in petroleum distillates treated with alkaline hypochlorite solution is substantially reduced.

The present invention may be described briefly as involving the treatment of a sour petroleum distillate containing organic acid bodies by contacting the sour distillate with an alkaline hypochlorite solution following which the alkaline hypochlorite solution is separated from the contacted distillate and recycled to treat additional quantities of the sour distillate, the particular feature of the invention being the steps of mixing fresh alkaline hypochlorite solution with the separated solution and then contacting the sour distillate with the resulting solution within approximately 30 seconds after mixing of the fresh alkaline hypochlorite solution with the separated solution.

The petroleum distillates forming a feed stock of the present invention are those distillates which contain organic acidic bodies, such as phenolic materials and naphthenic acids and organic acidic bodies usually associated with phenols and naphthenic acids encountered in such distillates. Cracked products boiling up to about 750° F. may suitably form a feed stock of the present invention. The cracked product may be either thermally cracked or catalytically cracked distillates or a mixture of the two.

The invention will be further illustrated by reference to the drawing in which the sole figure is a flow diagram of a preferred mode of practicing the invention.

Referring now to the drawing, numeral 11 designates a charge line by way of which a sour naphtha may be introduced into the system. This sour naphtha may be treated prior to introduction into the system with an alkaline solution to remove hydrogen sulfide therefrom to prevent excessive consumption of the alkaline reagent. It will be assumed for the purpose of this description that the sour naphtha in line 11 has been pre-washed with an alkaline solution. The sour naphtha in line 11 is pumped by pump 13 into an incorporating device 14. This incorporating device 14 may be a baffle-type incorporator as shown or any of the well-known mixing devices available on the market, such as jets, mixing tanks incorporating stirrers, and the like. In incorporator 14 the sour naphtha is intimately admixed with an alkaline hypochlorite solution introduced into line 11 by way of line 15. The description and source of the alkaline hypochlorite solution will be described in more detail hereinafter. After admixture of the alkaline hypochlorite solution with the sour naphtha in incorporator 14 the sour naphtha and hypochlorite solution are discharged by line 16 into a settling drum 17 wherein a separation is made between the contacted naphtha and the used alkaline hypochlorite solution.

The contacted naphtha is sweetened by passage through incorporator 14 and is withdrawn from settler 17 by line 18 to form a blend stock for gasoline. The used hypochlorite solution is withdrawn from settler 17 by line 19 and is divided into two parts, one part being continuously discarded through line 19 controlled by valve 20 while the other part is pumped by pump 21 in line 15 to line 11 as has been described.

The used alkaline hypochlorite solution in line 15 has added to it immediately before it is introduced into line 11 fresh alkaline hypochlorite solution by way of line 22. This fresh alkaline hypochlorite solution in line 22 is withdrawn from chlorinator 23 by pump 24. The fresh alkaline hypochlorite solution in chlorinator 23 is made up therein by introducing fresh caustic such as 27° Bé. sodium hydroxide solution by line 25 into chlorinator 23 and bubbling gaseous chlorine into the chlorinator 23, the gaseous chlorine being introduced by line 26 from a source, not shown. The chlorinator 23 is provided with cooling coils 27 to control the temperature therein. The chlorinator 23 is also provided with a vent stack 28 for discharge of unreacted chlorine.

From the foregoing description taken with the drawing it will be apparent that gaseous chlorine does not contact either the sour naphtha or the recirculated alkaline hypochlorite solution but it is a sodium hypochlorite solution which contacts both; hence the acidic bodies contained in both the sour naphtha and in the recirculated alkaline hypochlorite solution does not come into contact with gaseous chlorine and, therefore, reactions between free chlorine and the acidic bodies are substantially prevented. Furthermore, it will be noted that line 22 connects into line 15 right before the latter connects into line 11 and that the mixture of fresh and recirculated hypochlorite solution immediately contacts the sour naphtha in incorporator 14. It is desirable that the total time elapsing for the mixing and contacting operation be no greater than 30 seconds to prevent any substantial reaction between the sodium hypochlorite and the acidic bodies.

In order to illustrate the invention further, runs were made in which gaseous chlorine was added to a fresh sodium hydroxide solution and to a sodium hydroxide solution which contained organic acidic bodies including phenolic compounds. In the first instance, 260 volumes of sodium hydroxide solution having a Bé. gravity of 27° and a free sodium hydroxide content of 26 grams per liter and chlorine added to it in a sufficient amount to provide a sodium hydroxide solution theoretically containing 139 grams of chlorine per liter. This solution was tested after 5 minutes to determine the conversion to sodium hypochlorite. After this period of time the available chlorine was 92% of that theoretically possible. This run was conducted at a temperature ranging from 80° to 95° F.

In a second operation 300 volumes of a sodium hydroxide solution containing 120 grams per liter of sodium hydroxide and having a Bé. gravity of 15°, which contained 1% by weight of organic acidic material, was chlorinated to provide a sodium hypochlorite solution containing theoretically 6.33 grams per liter of available chlorine. After one minute, only 70% of the chlorine added was present as available chlorine and after this solution had been allowed to stand for 5 minutes it was found that only 65% of the chlorine added was present as available chlorine, indicating a substantial consumption of the chlorine by acidic bodies. This latter run was conducted at 45° F.

In another run the same sodium hypochlorite solution which contained acidic bodies was divided into 4 parts to which chlorine was added in increasing increments so that the fourth portion had 4 increments of chlorine added thereto. The volumes of sodium hydroxide solutions chlorinated in these instances were 900, 825, 727 and 620. The available chlorine theoretically obtainable from these 4 portions, respectively, was 6.9, 3.64, 6.6 and 6.29. After 3 minutes standing the available chlorine, as represented by conversion to hypochlorite, in the second portion was only 65% of that theoretically obtainable. After 5 minutes standing it was found that the conversion was such that the available chlorine in four portions were, respectively, 35.5, 54, 69 and 83 per cent of that theoretically obtainable, showing that it is necessary to introduce increasing increments of chlorine to obtain a solution having a high content of available chlorine. It will be immediately apparent that such operation is quite expensive.

To illustrate further the present invention, fresh hypochlorite solutions were made up and a solution of sodium hydroxide was obtained which contained phenolic bodies. The fresh hypochlorite solution and the caustic solution containing phenolic bodies and other acidic materials were then blended together in the ratio of about 1 part of fresh hypochlorite solution to about 5 parts of the caustic solution containing organic acidic material.

The results of these operations and the conditions under which they were conducted are presented in the table.

*Table*

| | Fresh Hypochlorite Solution | | Phenolic Caustic Solution | | Blend of Fresh Hypochlorite and Phenolic Caustic Solution in Indicated Amounts | |
|---|---|---|---|---|---|---|
| | A | B | C | D | A+C | B+D |
| Temperature, °F | 45 | 80 | 45 | 80 | 45 | 80 |
| Free NaOH, grams per liter | 104.5 | 104.5 | 120 | 120 | | |
| Volumes | 40 | 40 | 205 | 200 | 245 | 240 |
| Available Chlorine Content, grams per liter after 30 seconds | 128 | 128 | None | None | 17.8 | 17.1 |
| Acid Oil Content, Weight Percent | None | None | 1.0 | 1.0 | | |
| Available Chlorine Content Theoretically Obtainable by Blending, grams per liter | | | | | 20.9 | 21.3 |
| Conversion of Gaseous Chlorine to NaOCl, percent | | | | | 85.0 | 80.5 |

From the results in the table it will be apparent that blending fresh hypochlorite solution with the sodium hypochlorite solution containing phenolic material and other acidic bodies results in a hypochlorite solution in which the available chlorine is nearly as high as that obtainable theoretically. Furthermore, it will be apparent that the acidic bodies do not react readily with the sodium hypochlorite solution. Temperatures employed in admixing the fresh and recirculated solutions may range from 40° to about 100° F. Temperatures from 45° to 80° F. give good results.

In practicing our invention, it is desirable that the fresh hypochlorite solution have a free alkalinity in the range between 50 and 120 grams of free NaOH per liter of solution. It is also desirable that the chlorine content of the fresh hypochlorite solution be in the range from 100 to 180 grams per liter.

The fresh alkaline hypochlorite solution may be blended with the recirculated hypochlorite solution to provide alkaline hypochlorite solution having a strength sufficient to cause sweetening of the sour distillate. It is desirable that the blend of the fresh and the recirculated alkaline hypochlorite solution contain free sodium hydroxide in the range between about 50 and 150 grams per liter, having an available chlorine content in the range between 1 and 30 grams per liter. The available-chlorine content desired is a function of the mercaptan content of the stock to be treated, and of the ratio of hypochlorite solution circulated to the volume of naphtha treated. In general, it will require from 2 to 6 times the theoretical amount of chlorine, depending on the stock to be treated and the conditions, to produce a sweet product. Assuming that four times the theoretical amount of chlorine is required for a particular stock, and that the stock is contacted with ten volume per cent of hypochlorite solution, the blend should contain about 0.44 gram of available chlorine for each increase of one in copper number. For example, to treat a sour naphtha having a copper number of 20, when employing a 10 volume per cent treat, the blend of recirculated and fresh hypochlorite solution should contain about 8.8 grams of available chlorine. The available chlorine content of the recirculated solution is substantially zero. The fresh solution is preferably made up by adding about 160 grams of chlorine to each liter of 27 Bé. sodium hydroxide. Accounting for a volume increase of about 80 cc. per 100 grams of chlorine added, the fresh hypochlorite solution has a chlorine content of 144 grams per liter. We have found that, in making up a blend of fresh hypochlorite and spent solution being recirculated from the treatment of cracked naphthas, the final blend will usually have an available chlorine content of about 85 per cent of the calculated value, when employing the preferred conditions of our invention. To produce a blend having 8.8 grams per liter available chlorine, the solution must therefore be blended in the ratio of 1 part by volume of fresh hypochlorite to $$.85\left(\frac{144}{8.8}-1\right)$$

parts by volume of recirculated caustic which is a ratio of 1 to 13. The desired ratio of fresh hypochlorite to recirculating solution is a function of the conditions such as copper number of the stock to be treated, volume percent treat, chlorine consumption, etc. and is determined according to well known principles of stoichiometry.

For example to treat sour naphthas having copper numbers ranging from about 2 to about 40, the fresh solution may be blended with the recirculated solution in a ratio in the range from 1 to about 130 to 1 to about 6 parts by volume of fresh to recirculated solution.

The copper number to which reference has been made is determined in accordance with the method described in "U. O. P. Laboratory Test Methods for Petroleum and its Products," Universal Oil Products Company, Chicago, 1940, page H-61. This test is a measure of the mercaptan sulfur content, usually of petroleum distillates, and is equivalent to milligrams of mercaptan sulfur per 100 cc. of the sample tested.

The nature and object of the present invention having been completely described and illustrated, what we wish to claim as new and useful and to secure by Letters Patent is:

1. In the hypochlorite sweetening of a sour petroleum distillate containing organic acidic bodies in which said petroleum distillate is contacted with an alkaline hypochlorite solution, the solution separated and re-cycled to contact additional quantities of said sour distillate, the method of preventing substantial reaction of acidic bodies in said distillate and separated solution which includes the steps of mixing fresh alkaline hypochlorite solution with said separated solution and then contacting said sour distillate with the mixture within 30 seconds after mixing.

2. A method in accordance with claim 1 in which the fresh alkaline hypochlorite solution is sodium hypochlorite having a free alkalinity in the range between 50 and 120 grams of free NaOH per liter and an available chlorine content in the range from 100 to 180 grams per liter.

3. In the hypochlorite sweetening of a sour petroleum distillate containing organic acidic bodies in which said petroleum distillate is contacted with an alkaline hypochlorite solution, the solution separated and recycled to contact additional quantities of said sour distillate, the method of preventing substantial reaction of acidic bodies in said distillate and separated solution which includes the steps of mixing fresh alkaline hypochlorite solution with said separated solution at a temperature in the range between 40° and 100° F. and then contacting said sour distillate with the mixture within 30 seconds after mixing.

4. In the hypochlorite sweetening of a sour petroleum distillate containing organic acidic bodies in which said petroleum distillate is contacted with a sodium hypochlorite solution, the solution separated and recycled to contact additional quantities of said sour distillate, the method of preventing substantial reaction of acidic bodies in said distillate and separated solution which includes the steps of mixing fresh sodium hypochlorite solution having a free alkalinity in the range between 50 and 120 grams of free NaOH per liter and an available chlorine content in the range from 100 to 180 grams per liter with said separated solution at a temperature in the range between 40° and 100° F. and then contacting said sour distillate with the mixture within 30 seconds after mixing.

5. In the hypochlorite sweetening of a sour petroleum distillate having a copper number in the range between 2 and 40 containing organic acidic bodies in which said petroleum distillate is contacted with a sodium hypochlorite solution, the solution separated and re-cycled to contact additional quantities of said sour distillate, the method of preventing substantial reaction of acidic bodies in said distillate and separated solution which includes the steps of mixing fresh sodium hypochlorite solution with said separated solution in a ratio in the range from 1 part of fresh solution to about 130 parts of separated solution to 1 part of fresh solution to about 6 parts of separated solution at a temperature in the range from 40° to 100° F. and then contacting said sour distillate with the mixture within 30 seconds after mixing.

MATHIS T. WADDELL.
HAROLD W. EARHART.
ROBERT M. LOVE.
JAMES S. TILLER.

No references cited.